D. & S. A. BEATON.
Nut-Lock.

No. 166,957. Patented Aug. 24, 1875.

Witnesses:
L. F. Brus
A. P. Grant

Inventors:
David Beaton
Samuel A. Beaton
by John A. Diederskin
Atty.

UNITED STATES PATENT OFFICE.

DAVID BEATON AND SAMUEL A. BEATON, OF PHILADELPHIA, PA.

IMPROVEMENT IN NUT-LOCKS.

Specification forming part of Letters Patent No. 166,957, dated August 24, 1875; application filed January 6, 1875.

*To all whom it may concern:*

Be it known that we, DAVID BEATON and SAMUEL A. BEATON, both of the city and county of Philadelphia, and State of Pennsylvania, have invented a new and useful Improvement in Lock-Nuts and Washers; and we do hereby declare the following to be a clear and exact description of the nature thereof, sufficient to enable others skilled in the art to which our invention appertains to fully understand, make, and use the same, reference being had to the accompanying drawings making part of this specification, in which—

Figure 1:
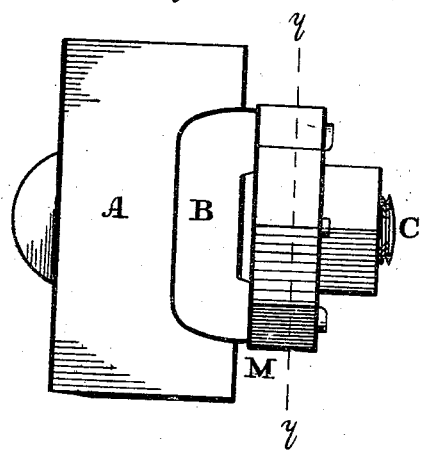
Figure 2:
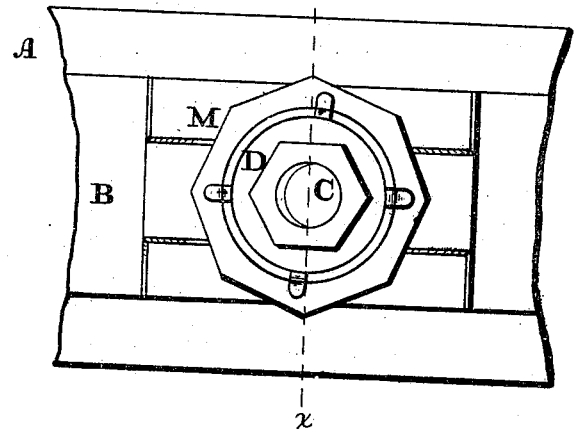
Figure 3:
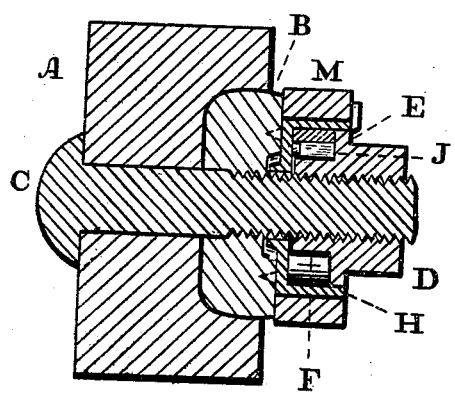
Figure 4:
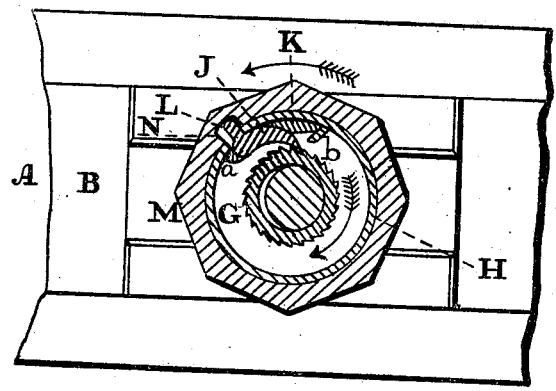

Figure 1 is a side elevation of the device embodying our invention. Fig. 2 is a front view thereof. Fig. 3 is a transverse section in line $x$ $x$, Fig. 2. Fig. 4 is a longitudinal section in line $y$ $y$, Fig. 1.

Similar letters of reference indicate corresponding parts in the several figures.

Our invention consists in a cup-shaped washer in connection with a nut outside thereof, and a serrated portion within said washer, and a locking-pawl partly within and partly without the washer. It also consists in a serrated nut and locking dog or pawl having a band for disengaging the dog or pawl of said nut.

Referring to the drawings, A represents the rail or piece to be united, and B the fish-bar or plate through which the bolt C is passed. D represents the nut, which is internally threaded, as usual, and externally made angular for application of a wrench or key. The nut is flanged, as at E, and continued or extended into a part, F, whose surface is serrated, as at G. H represents a cup-shaped washer, which is fitted on the bolt C, and adapted to receive the part F of the nut D. At a point of the circumference of the washer there is jointed a pawl, J, whose nose or point projects into the space of the washer, so as to engage with the serrations G of the extension F of the nut D, the pawl being held in contact or engaged with the said serrations G by means of a spring, K, suitably applied. One end of the axial pin or pintle of the pawl J is fitted in an opening in the washer, or a pintle may be formed with the washer and enter an opening in the pawl. The other end of the pin or pintle may enter a groove on the under side of the flange E, of the nut so that said flange will assist in keeping the pawl in position, but without being interfered with during the rotation of the nut. With the washer will be cast a piece, $a$, which occupies a position behind the pawl, so as to constitute a bearing therefor, and a piece, $b$, will also be cast with the washer for confining the spring K, and preventing its displacement from the pawl J. The pawl is extended beyond its axis into a toe, L, which projects beyond the periphery of the washer. M represents a band which circumscribes the washer, and has on its inner periphery a transversely-extending groove, N, into which is received the toe L of pawl J. In order that the washer H is held from rotation, its under side has projections, which enter a groove or opening on the face of the bar B, and the washer H and band M are connected to each other by means of lugs on the washer, which are turned down over the band, but without, however, preventing the rotation of the band. The surface of the band M will be squared or angular for application of a wrench or key.

The operation is as follows: The bar B and bolt C being in position, the washer H, with the circumscribing band M, is fitted on the bolt. The nut D is now screwed down and tightened on the bolt, and the serrations G of the extension F of the nut are engaged by the pawl J, whereby it is evident that the nut will be locked and cannot of itself unscrew. When, however, the nut is to be loosened or removed, a wrench or key is applied to the band M, and operated so as to rotate the band M in such direction that one wall of the groove N will ride over or press against the toe L of the pawl J, and thus lift the pawl from the serrations G of the nut. It will now be seen that the nut D may be readily unscrewed, it being no longer locked or held by the pawl J. The pieces $a$ $b$ will serve to limit the inward movement of the nut and prevent crushing or fracture of the pawl.

If desired, the flange E and serrated extension F may be formed together in one piece and a separated nut be employed, said nut engaging with the flange by means of lugs or teats on the outer face of said flange, the operation, however, being the same as in the previous case; but the construction admits of more convenience and cheapness in manufacture.

Having thus described our invention, what we claim as new, and desire to secure by Letters Patent, is—

1. The nut D, provided with the serrated collar F, in combination with the cup-shaped washer H and dog J, constructed and operating as set forth.

2. The combination, with the serrated nut and locking dog or pawl, of the disengaging-band M, substantially as and for the purpose set forth.

DAVID BEATON.
SAMUEL A. BEATON.

Witnesses:
JOHN A. WIEDERSHEIM,
ALBERT H. HOECKLEY.